(12) United States Patent
Meier (10) Patent No.: US 11,267,086 B2
(45) Date of Patent: Mar. 8, 2022

(54) METHOD FOR PRODUCING A CONSTRUCTED CAMSHAFT OF AN INTERNAL COMBUSTION ENGINE

(71) Applicants: THYSSENKRUPP PRESTA TECCENTER AG, Eschen (LI); thyssenkrupp AG, Essen (DE)

(72) Inventor: Alex Meier, Triesen (LI)

(73) Assignees: THYSSENKRUPP PRESTA TECCENTER AG, Eschen (LI); THYSSENKRUPP AG, Essen (DE)

( * ) Notice: Subject to any disclaimer, the term of this patent is extended or adjusted under 35 U.S.C. 154(b) by 296 days.

(21) Appl. No.: 16/307,420

(22) PCT Filed: Jun. 6, 2017

(86) PCT No.: PCT/EP2017/063683
§ 371 (c)(1),
(2) Date: Dec. 5, 2018

(87) PCT Pub. No.: WO2017/211804
PCT Pub. Date: Dec. 14, 2017

(65) Prior Publication Data
US 2019/0160605 A1 May 30, 2019

(30) Foreign Application Priority Data
Jun. 7, 2016 (DE) .................. 10 2016 210 024.6

(51) Int. Cl.
*B23P 11/02* (2006.01)
*F01L 1/047* (2006.01)
(Continued)

(52) U.S. Cl.
CPC ............. *B23P 11/025* (2013.01); *F01L 1/047* (2013.01); *F16C 35/063* (2013.01);
(Continued)

(58) Field of Classification Search
CPC ... B23P 11/025; B23P 2700/02; F16C 35/063; F16C 2360/18; F16D 1/0858;
(Continued)

(56) References Cited

U.S. PATENT DOCUMENTS 4,597,365 A * 7/1986 Madaffer ................ F01L 1/047
123/90.6
9,416,687 B2 * 8/2016 Menonna ................ F01L 1/047
(Continued)

FOREIGN PATENT DOCUMENTS

DE         923 760 C      2/1955
DE         33 01 749 A    8/1984
(Continued)

OTHER PUBLICATIONS

Waseda; JP2011117318, machine translation; Jun. 16, 2011 (Year: 2011).*

(Continued)

*Primary Examiner* — Ryan J. Walters
(74) *Attorney, Agent, or Firm* — thyssenkrupp North America, LLC (57) ABSTRACT

A method for producing a constructed camshaft of an internal combustion engine may be used in connection with a camshaft having a cam, a shaft, and an anti-friction bearing. The method may involve machining the cam, machining the shaft to produce a setting region for arranging the cam, heating the cam and the anti-friction bearing, pushing the cam onto the shaft into a preliminary position and pushing the anti-friction bearing onto the shaft into a bearing position, equalizing a temperature between the shaft, the cam, and the anti-friction bearing by cooling at least the cam, and setting the cam onto an end position by way of pushing the cam onto the setting region.

17 Claims, 3 Drawing Sheets

(51) Int. Cl.
  *F16D 1/08*    (2006.01)
  *F16H 53/02*   (2006.01)
  *F16C 35/063*  (2006.01)
  *F16B 4/00*    (2006.01)

(52) U.S. Cl.
  CPC ......... *F16D 1/0858* (2013.01); *F16H 53/025* (2013.01); *B23P 2700/02* (2013.01); *F01L 2001/0471* (2013.01); *F01L 2001/0475* (2013.01); *F01L 2001/0476* (2013.01); *F01L 2301/00* (2020.05); *F01L 2303/00* (2020.05); *F16B 4/006* (2013.01); *F16C 2360/18* (2013.01)

(58) Field of Classification Search
  CPC ........ F16H 53/025; F16B 4/006; F01L 1/047; F01L 2301/00; F01L 2303/00; F01L 2001/0475; F01L 2001/0471; F01L 2001/0476
  See application file for complete search history.

(56) References Cited

U.S. PATENT DOCUMENTS

| | | | |
|---|---|---|---|
| 2013/0283613 A1 | 10/2013 | Walter | |
| 2015/0075457 A1* | 3/2015 | Menonna | F01L 1/047 123/90.6 |
| 2015/0251238 A1 | 9/2015 | Wiesner | |
| 2015/0343576 A1 | 12/2015 | Stappelmann | |

FOREIGN PATENT DOCUMENTS

| | | |
|---|---|---|
| DE | 10 2010 026 739 A | 1/2012 |
| DE | 10 2010 045 047 A | 3/2012 |
| DE | 10 2012 025 442 A | 6/2014 |
| DE | 102014101088 A | 7/2015 |
| DE | 10 2014 106 924 A | 11/2015 |
| DE | 10 2014 220 858 A | 4/2016 |
| DE | 10 2007 063 725 B | 6/2016 |
| EP | 2 065 603 | 6/2009 |
| JP | 2009-092083 A | 4/2009 |
| JP | 2009-127807 A | 6/2009 |
| JP | 2011-117318 A | 6/2011 |
| WO | 2006/091356 A | 8/2006 |
| WO | 2015/113748 A | 8/2015 |

OTHER PUBLICATIONS

English Translation of International Search Report issued in PCT/EP2017/063683, dated Dec. 5, 2017.

\* cited by examiner

METHOD FOR PRODUCING A CONSTRUCTED CAMSHAFT OF AN INTERNAL COMBUSTION ENGINE

CROSS REFERENCE TO RELATED APPLICATIONS

This application is a U.S. National Stage Entry of International Patent Application Serial Number PCT/EP2017/063683, filed Jun. 6, 2017, which claims priority to German Patent Application No. DE 10 2016 210 024.6, filed Jun. 7, 2016, the entire contents of both of which are incorporated herein by reference.

FIELD

The present disclosure generally relates to internal combustion engines, including methods for producing constructed camshafts of internal combustion engines.

BACKGROUND

It is fundamentally known that, during the production of a camshaft, the shaft, respectively the tube and an end piece are joined together in a preassembly operation, for example. The shaft and the end piece have corresponding materials, such as C60 or C53, in order to make hardened bearing points for mounting the shaft within, for example, a cylinder head cover possible. After the preassembly of the shaft and the end piece, complete grinding of the preassembled and at least partially treated shaft takes place in a known way, with the result that all essential fits and bearing seats are ground universally. The treated shaft is to be understood to mean, for example, a shaft, in the case of which the bearing points are present in at least partially hardened form and/or roll-formed portions have already been applied to the outer surface of the shaft. In the main assembly, the cams are then set onto the shaft, direct running anti-friction bearings, for example, being applied to the shaft between the respective individual cams. For positioning and spacing the anti-friction bearings apart in a defined manner, spacer elements which usually consist of plastic are also applied to the shaft, for example. After the arranging of the cams, the bearings and the spacer elements, the machining of the cams then first of all takes place, in particular in relation to the bearing points of the shaft. Here, the cams are machined in a grinding method. For this purpose, it is necessary to cover the anti-friction bearings which have already been applied to the shaft, in such a way that grinding residues and therefore contaminants do not pass into the anti-friction bearings. This necessitates complex covering of the anti-friction bearings, by way of which in turn a correct reference with respect to the bearing points is prevented for the grinding process of the cams. After the machining of the cams, the cleaning of the completely constructed camshaft which is produced in this way takes place while still in the encapsulated state of the anti-friction bearings. The bearing covers are not removed until the end. As a consequence, the machining of the cams after the application of said covers on the shaft leads to an expensive grinding process of the entire camshaft; contamination of the anti-friction bearings cannot be ruled out. Contamination of the anti-friction bearings, however, leads to an impaired function and disadvantageously even to the malfunction of the anti-friction bearings and therefore to damage of the entire constructed camshaft.

Accordingly, it is known from the prior art to machine the cams before being arranged on the shaft, in particular to produce them in a state which is ready for use. Methods for arranging cams, for example, which are machined in this way on a load-bearing shaft for producing a constructed camshaft are known, for example, from DE 10 2010 045 047 A1 or DE 10 2012 025 442 A1. It is indicated herein, for example, how cams are arranged at their end position in a closed bearing gate. Before the cams are pushed onto the load-bearing shaft, respectively the load-bearing shaft is pushed through the cams, the cams are heated and/or the shaft is cooled. After a temperature equalization between the cams and the shaft, the cams are then set into their predefined end position. Here, the cams are pushed in the axial direction along the camshaft onto a machined region of the load-bearing shaft, which machined region has a circumference which is enlarged in comparison with the remaining rest of the shaft in such a way that a press joint occurs between the shaft and the cam during setting of the cams onto the machined region of the shaft. In order to mount the shaft in correspondingly configured (closed) bearings of the cylinder head cover, the shaft has corresponding bearing sections. Said bearing sections are regions which are produced on the circumferential face of the shaft and have an enlarged diameter relative to the remaining sections of the shaft. Accordingly, it is necessary to use materials for the configuration of the shaft, by means of which materials it is made possible to produce bearing points, respectively bearing regions on the shaft which are configured in a defined manner, in particular are hardened. This applies correspondingly to an end piece which is to be connected to the camshaft, if said end piece is likewise to have a corresponding bearing point. This restricts the material selection considerably during the production of the camshaft. On account, in particular, of the requirement of the industry, in particular of the OEMs who aim for a constant weight reduction of the vehicles and, as a consequence, also of the engine elements, the supply industry is encouraged to use materials which are lighter and nevertheless sufficiently stable for the application even in the case of the production of the camshafts, in particular the constructed camshafts, in order to produce a camshaft which is functionally reliable and has a long service life.

Thus a need exists to at least partially eliminate the above described disadvantages in methods for producing a constructed camshaft of an internal combustion engine. In particular, a need exists for methods for producing a camshaft that make use of a very wide variety of materials for the camshaft in a simple and inexpensive way. Moreover, a need exists for camshafts and methods for producing camshafts that can be integrated into a cylinder head cover in a simple way.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The method for producing a constructed camshaft of an internal combustion engine, the camshaft comprising at least one cam, a shaft and at least one anti-friction bearing, has at least the following steps:

a) machining of the at least one cam, b) machining of the shaft, at least one setting region of the at least one cam being produced, c) heating of the at least one cam and the anti-friction bearing, d) pushing of the at least one cam onto the shaft into a preliminary position, and pushing of the anti-friction bearing onto the shaft into a bearing position, e) temperature equalization between the shaft and the at least one cam, respectively the anti-friction bearing by way of at least cooling of the cam and the anti-friction bearing, f) setting of the at least one cam onto the end position by way of the cam being pushed onto the setting region.

In accordance with said method, it is conceivable, in addition, that more than one cam, for example two or more cams, are pushed onto the shaft. The shaft is configured, for example, as a hollow shaft or else as a solid shaft. It is possible that the shaft consists, for example, of a standard tube material E355+C. The anti-friction bearing itself is advantageously a needle bearing. In the case of a plurality of cams, they are consequently configured on the shaft spaced apart from one another in the axial direction along the longitudinal axis. Accordingly, the setting regions are also configured spaced apart from one another on the outer surface of the shaft in a manner which corresponds to the number of cams to be arranged on the shaft. It is also conceivable that a corresponding bearing region for arranging the at least one anti-friction bearing and advantageously a plurality of bearing regions for arranging a plurality of anti-friction bearings on the shaft is/are produced. It is possible here that the production of the setting region for a cam corresponds to the production of a bearing region for an anti-friction bearing. This means that, as a consequence, the two regions are produced by means of the same machining method and advantageously have the same configuration. It is likewise conceivable that the bearing region is produced by means of a machining method of the shaft which is different than the setting region and, as a consequence, has a configuration which is different than the setting region. The machined shaft advantageously has defined setting regions and defined bearing regions, with the result that, in the case of an application of the at least one anti-friction bearing to the shaft, said anti-friction bearing can be applied to a position, in order to mount the camshaft in a predefined manner within a cylinder head cover.

In the case of the abovementioned method, the at least one anti-friction bearing is advantageously already applied to its bearing end position, whereas the at least one cam is set to a preliminary position and pushing of the cam onto the setting region and, as a consequence, onto its end position takes place only after the temperature equalization between the shaft and the cam, respective the anti-friction bearing. Accordingly, the preliminary position is configured directly in front of or so as to overlap the setting region in the axial direction along the longitudinal axis of the shaft, as viewed in the pushing-on direction. It is also conceivable, however, that the anti-friction bearing is also moved first of all into a preliminary position and is moved into its bearing end position only after a temperature equalization between the shaft and the cam, respectively the shaft and the anti-friction bearing. The at least one cam and the anti-friction bearing are advantageously heated to a temperature of from approximately 170° C. to 220° C. In order to produce a temperature equalization, it is possible that the cam and the anti-friction bearing are cooled actively or else passively. This means that, in the case of active cooling, for example, a cooling medium, such as a gaseous or liquid cooling medium, is applied to the cams and the anti-friction bearing, as a result of which an accelerated temperature equalization advantageously takes place between the shaft and the cam, respectively the anti-friction bearing.

It is conceivable, furthermore, that the shaft is cooled before or after step c). This means that, in addition to heating of the cam and the anti-friction bearing, the shaft is cooled to a temperature below its normal temperature by means, for example, of a corresponding cooling medium. As a result, pushing of the shaft into the passage opening of the at least one cam and into the inner ring of the anti-friction bearing, respectively pushing of the cam and the anti-friction bearing onto the shaft is simplified. In particular, heating of the cam and the anti-friction bearing is either advantageously not necessary at all or is necessary merely at low temperatures.

It is possible, furthermore, that the shaft is heated in order to equalize the temperature in accordance with step e). This means that, in the case of cooling of the shaft before the positioning, in particular the setting of the at least one cam and the anti-friction bearing, the following temperature equalization in turn takes place by means of heating of the shaft.

Furthermore, it is conceivable that, in step b), at least one bearing region for arranging the at least one anti-friction bearing on the shaft is additionally produced. The setting region and the bearing region are advantageously produced on predefined regions of the shaft in a manner which is spaced apart from one another in the axial direction on the shaft by means of an identical machining tool. As a result, the machining time of the shaft, in particular the assembly time of the constructed camshaft, is advantageously reduced. The bearing region advantageously serves for arranging the anti-friction bearing in a reliable manner in terms of the process, in particular for arranging the anti-friction bearing, in particular its inner ring, in a non-positive manner with the shaft.

Within the context of the invention, furthermore, it is conceivable that the setting region is produced by means of forming of an elevation on the outer surface of the circumferential face of the shaft. Said elevation is present, for example, in the form of a material accumulation or material structure. On account of the elevation, the setting region advantageously has a maximum diameter which is greater than the diameter of the regions of the non-machined shaft. During the production of a bearing region, it is possible that said bearing region is also produced by means of forming of an elevation on the outer surface of the circumferential face.

It is conceivable that the elevation of the setting region and/or the elevation of the bearing region are/is produced by means of a roll-forming method or a grinding method. It is also possible that the elevation is produced by way of an introduction of a spline system into the outer surface of the circumferential face. It is thus possible, furthermore, that, for example, the cam also has an internal spline system which is configured within the passage opening. This advantageously leads to an optimization of the press-fit connection which is to be produced between the cam and the shaft.

Furthermore, it is possible that, during step d), in each case one spacer element is arranged on the shaft on both sides of the anti-friction bearing. Accordingly, it is possible that a spacer element is arranged between the anti-friction bearing and the cam or else between the anti-friction bearing and an end piece of the constructed camshaft. It is also conceivable that the spacer elements are heated in step d), before they are arranged on the shaft. This is the case, in particular, when the spacer elements consist of a metallic material, with the result that they can be shrink-fitted onto the shaft in the case of a temperature equalization. As a result, arranging of the spacer elements on the shaft without an unbalance is advantageously made possible. It is conceivable, furthermore, that the spacer elements consist, however, of a plastic material, with the result that they are pushed onto the advantageously cooled shaft without the action of heat.

It is possible that the shaft is connected to an end piece before or after step b) is carried out. The end piece comprises, respectively forms the receptacle for, for example, a rotary transducer or a gearwheel or a phaser. The end piece is advantageously arranged at a distal end, in particular an end side of the shaft. It is possible, furthermore, that an anti-friction bearing, in particular a further anti-friction bearing, is attached to the end piece, respectively on the end piece. Accordingly, it is possible that the end piece is connected to the shaft before the shaft is cooled, respectively the at least one cam and the anti-friction bearing are heated and are arranged on the shaft. The end piece advantageously consists of the standard end piece material 44SMn28.

Furthermore, it is possible that the machining of the at least one cam comprises grinding in order to produce a cam which is ready for use. Accordingly, the at least one cam which is to be applied to the shaft is advantageously finished before the application to the shaft, in such a way that reworking of the cam which is arranged in the end position on the shaft, such as grinding of the cam, is no longer necessary.

It is possible that a cylindrical roller bearing, in particular a needle bearing, is used as an anti-friction bearing. Here, the anti-friction bearing has, for example, an outer ring, an inner ring, and a rolling body which is arranged between the outer ring and the inner ring. Needles, respectively needle-shaped rolling bodies are advantageously used as rolling bodies in the case of a needle bearing. The rolling bodies are advantageously guided in a cage and, with regard to the rotational axis, extend in the axial direction along the longitudinal axis of the camshaft. The anti-friction bearing is advantageously a radial bearing which does not experience any axial guidance (or at least does not necessarily experience any axial guidance) by means of an additionally configured bearing stop, for example on the shaft of the camshaft or a housing which surrounds the camshaft, such as the cylinder head cover. The anti-friction bearing is merely pressed with its inner ring onto the shaft, respectively is pressed onto a bearing region of the shaft, in such a way that at least the inner ring of the anti-friction bearing is connected to the shaft fixedly such that it cannot be displaced axially, as viewed in the axial direction. In order that, as a consequence, the outer ring of the anti-friction bearing is also not displaced, respectively cannot be displaced in the axial direction along the longitudinal axis of the shaft, respectively the camshaft, it is advantageous if the anti-friction bearing forms a unit which is fixed within itself, respectively closed within itself. To this end, the inner ring or the outer ring or the two rings, namely the inner ring and the outer ring, has/have at least (in each case) one projection, for example in the form of a lug, configured on each of the two end sides of the ring, respectively the rings. Starting from the respective end side of the respective ring, said at least one projection extends in the radial direction toward the other one of the rings of the anti-friction bearing. The at least one projection of the one ring advantageously covers the end side of the other ring at least in sections. As viewed in the axial direction, the at least one projection of the one ring advantageously lies spaced apart from either the end side of the other ring or from the projection of the other ring. The ring, inner ring or outer ring, which comprises the projection (if the other one of the two rings does not have a projection) particularly advantageously has a length which extends in the axial direction and is greater than that length of the other ring which extends in the axial direction. By means of the configuration of the projection, an axial displacement between the inner ring and the outer ring of the anti-friction bearing is prevented. As a consequence, the projection of one of the rings advantageously forms the axial stop of the bearing. The projection can also be configured in the form of a wall which extends on the end side of one of the rings in the radial direction and is closed in the circumferential direction. However, the projection is advantageously merely a lug which extends in the radial direction, as a result of which the friction between the inner ring and the outer ring is kept low.

As a consequence, furthermore, an anti-friction bearing, in particular a needle bearing with an inner ring and an outer ring, is claimed which is a constituent part, respectively component of a constructed camshaft, the camshaft additionally comprising at least one cam and a shaft, and serving to mount the shaft, in particular the constructed camshaft. The anti-friction bearing advantageously has a projection which extends in the radial direction in each case on the end side of the outer ring and/or the inner ring.

Figure 1:
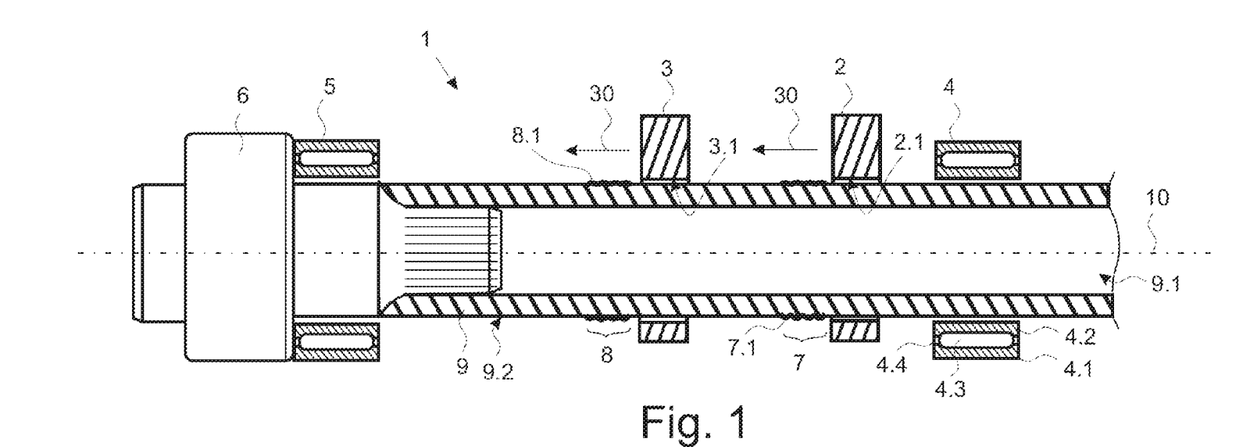
FIG. 1 is a lateral sectional view of an example constructed camshaft during a method step involving pushing cams onto an end position.

FIG. 1 shows a lateral sectional illustration of one embodiment of a constructed camshaft 1. The camshaft 1 has a shaft 9 which is configured, in particular, as a hollow shaft. An end piece 6 is connected to the shaft 9. A distal end of the end piece 6 extends at least in sections into a through opening 9.1 of the shaft 9. It is also conceivable that the shaft 9 is configured as a solid shaft and the through opening 9.1 which is shown in FIG. 1 extends merely, starting from an end side of the shaft 9, into the shaft 9 in sections in the form of a blind bore. In this embodiment, the blind bore is then dimensioned in such a way that the distal end of the end piece 6 can be received. The end piece 6 is advantageously machined, respectively produced from a solid shaft. A cam 2 and a further cam 3 are pushed in the mounting direction 30 from a preliminary position into an end position and, as a consequence, in the direction of the setting region 7, respectively 8. The cam 2, respectively the further cam 3 are advantageously heated to a temperature of from approximately 170° C. to approximately 220° C. Furthermore, it is conceivable that the shaft 9 is cooled. As a result, a defined spacing is produced between the passage opening 2.1, respectively 3.1 of the cam 2, respectively the further cam 3 and the outer surface 9.2 of the shaft 9, with the result that the cams 2, respectively 3 can also be pushed beyond setting regions 7, respectively 8 without the occurrence of clamping, in order to be set at their defined preliminary position. The setting regions 7 and 8 are produced by means of an elevation 7.1, respectively 8.1, in particular a material elevation, advantageously a material accumulation or material structuring. The setting regions 7 and 8 are advantageously formed on the outer surface 9.2 of the shaft 9 by means of roll-forming. Furthermore, the camshaft 1 has an anti-friction bearing 4 which is arranged on the shaft 9. The anti-friction bearing 4 has the components which are known fundamentally, namely an outer ring 4.1, an inner ring 4.2, rolling bodies 4.3 and a cage 4.4. A further anti-friction bearing 5 is arranged by way of example on the end piece 6 and is of comparable configuration to the anti-friction bearing 4 with regard to their components. The cam 2 and the further cam 3 are arranged in a preliminary position such that they are spaced apart from one another in the axial direction along the longitudinal axis 10. As a consequence, the preliminary position lies, as viewed in the mounting direction 30, axially along the longitudinal axis 10 in front of the respective setting regions 7, respectively 8. The cam 2 and the further cam 3 are advantageously moved in the same mounting direction 30, in order to be displaced from a preliminary position to an end position, in particular to the setting region 7, respectively 8. It would also be conceivable, however, that the cam 2 is moved onto the setting region 7 in a first mounting direction 30, whereas the further cam 3 is moved onto the setting region 8 in a mounting direction (not shown here) which is opposed with respect to the mounting direction 30. The anti-friction bearing 4 and the further anti-friction bearing 5 are advantageously already arranged in their end position, with the result that a displacement of the anti-friction bearings 4 and 5 is also no longer necessary after a temperature equalization between the cams 2 and 3, respectively the anti-friction bearings 4 and 5 and the shaft 9. It is conceivable that the setting region 8 is ground by means of a tube grinding operation, advantageously the roll-forming of the setting region 8, as a result of which the position and also the tolerances of the cams 2 and 3 can advantageously be defined more precisely.

Figure 2:
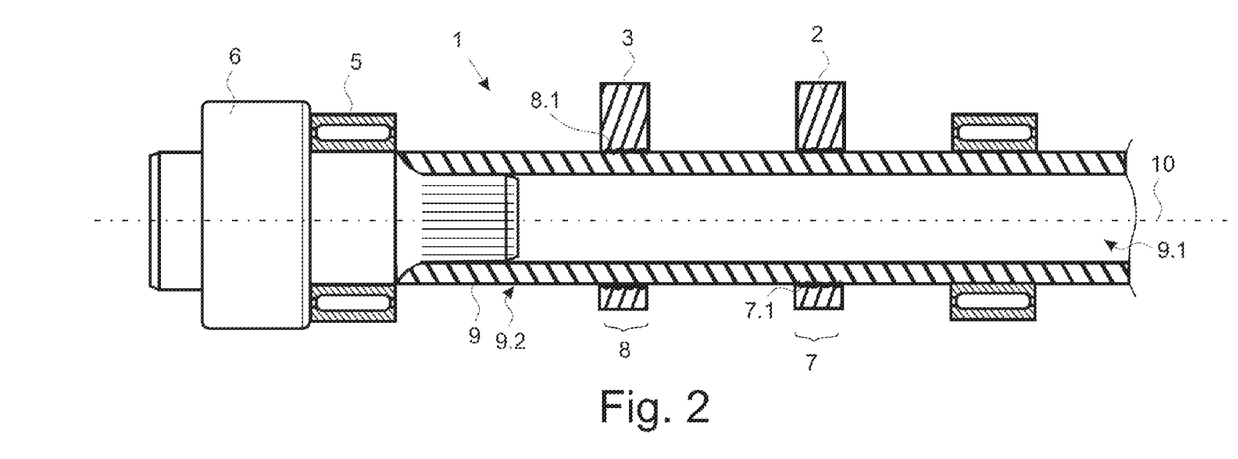
FIG. 2 is a lateral sectional view of the constructed camshaft of FIG. 1, with cams set at the end position.

FIG. 2 shows a lateral sectional illustration of that embodiment of a constructed camshaft 1 which is shown in FIG. 1, in the final mounted state. This means that the cam 2 and the further cam 3 are arranged, respectively set in the end position on the corresponding setting regions 7 and 8. Here, a (transverse) press-fit connection is produced between the cams 2, respectively 3 and the shaft 9 in the shaft section of the setting regions 7, respectively 8.

Figure 3:
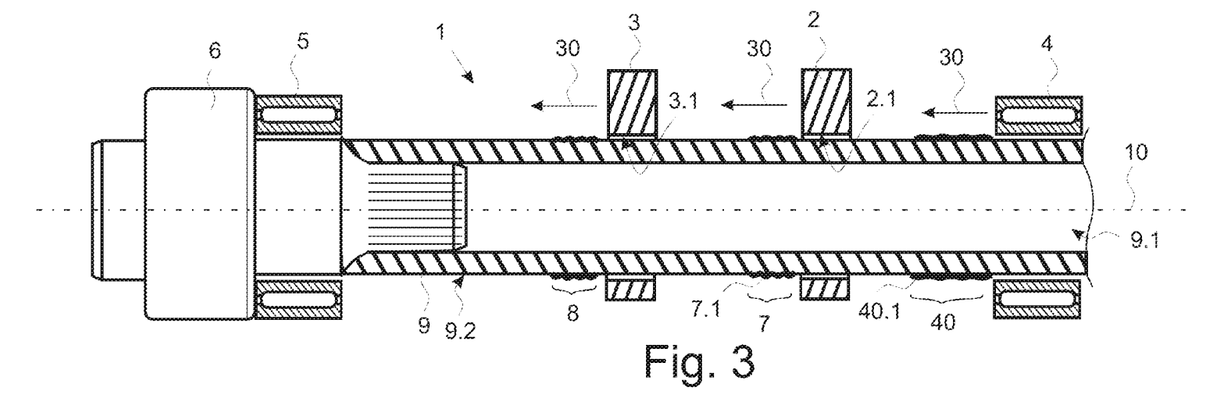
FIG. 3 is a lateral sectional view of another example constructed camshaft during a method step involving pushing cams and an anti-friction bearing onto an end position.
Figure 4:
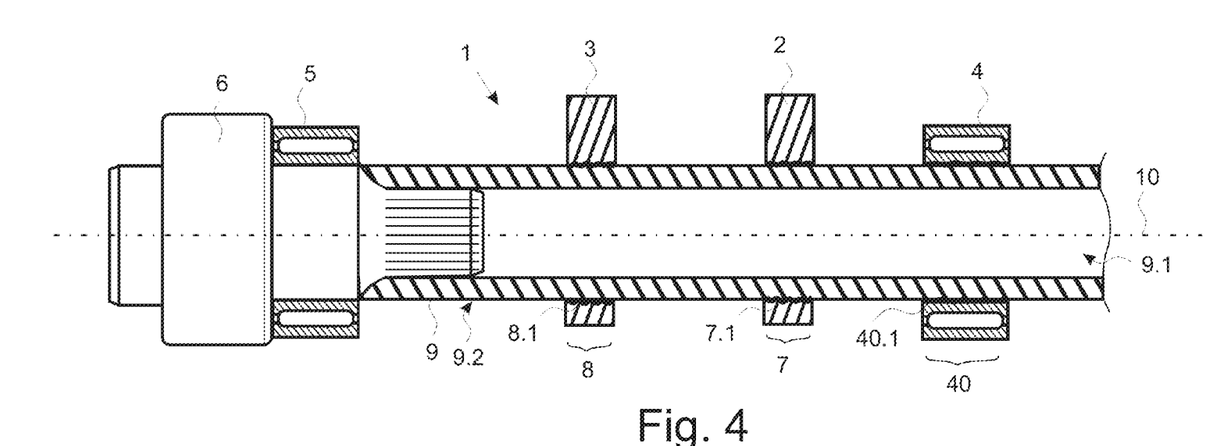
FIG. 4 is a lateral sectional view of the constructed camshaft of FIG. 3, with cams set at the end position.

FIGS. 3 and 4 show a further embodiment of a constructed camshaft 1, which embodiment differs from the embodiment of the camshaft 1 in accordance with FIGS. 1 and 2 in that the anti-friction bearing 4 is also set onto a machined bearing region. As shown in FIG. 3, the anti-friction bearing 4 is set onto a preliminary position which, as viewed in the mounting direction 30, lies axially along the longitudinal axis 10 in front of the bearing region 40. The bearing region 40 is advantageously produced in a comparable manner with respect to the setting regions 7 and 8 by means of an elevation 40.1, in particular a material accumulation, particularly advantageously by means of roll-forming. It is also conceivable that the bearing region 40 has a differing surface structure, respectively surface design in comparison with the setting regions 7 and 8. In a comparable manner to the setting of the cams 2 and 3, the anti-friction bearing 4 is also pushed onto a preliminary position on the shaft 9 after heating to, for example, approximately 170° C. and is set onto the bearing region 40 and accordingly onto its end position only after a temperature equalization between the anti-friction bearing 4 (and, as a consequence, also the cams 2 and 3) and the shaft 9. It is conceivable that the bearing region 40, advantageously the roll-formed portion of the bearing region 40, is ground by means of a tube grinding operation, as a result of which the position and also the tolerances of the anti-friction bearing can advantageously be defined more precisely.

Figure 5:
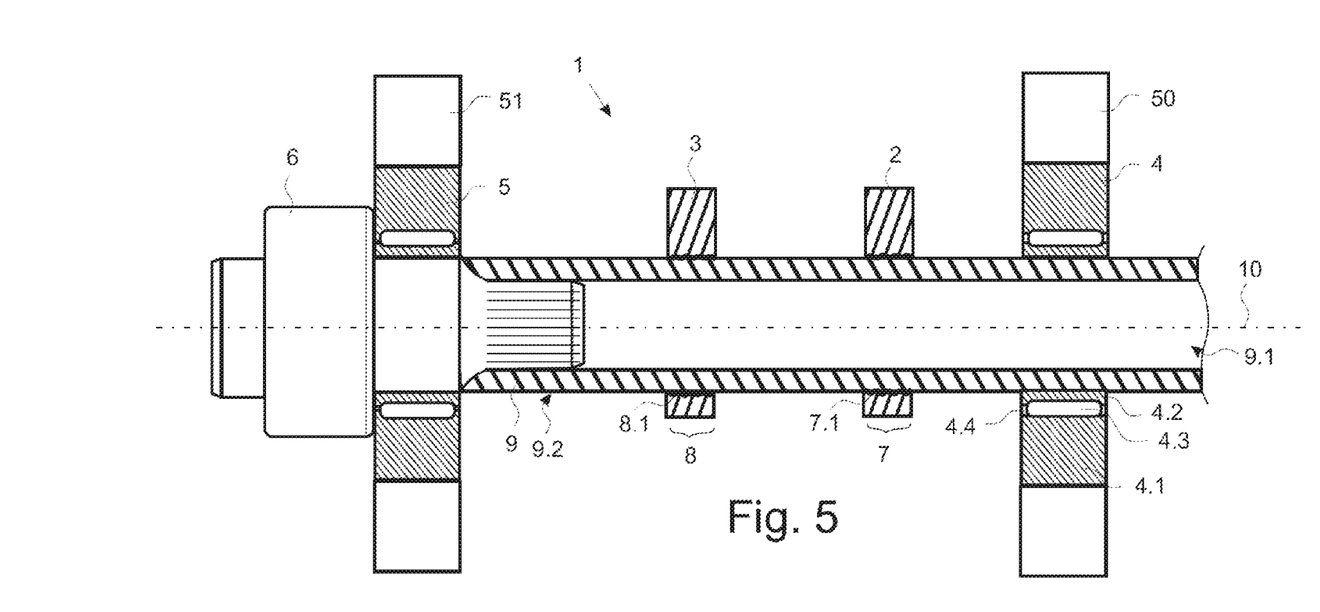
FIG. 5 is a lateral sectional view of still another example constructed camshaft within closed bearings of a cylinder head cover.

FIG. 5 shows a further embodiment of a constructed camshaft 1, which embodiment differs from that embodiment of a constructed camshaft which is shown in FIGS. 1 and 2 in that the anti-friction bearing 4 and the further anti-friction bearing 5 have an outer ring 4.1 with an enlarged diameter. It is advantageously possible as a result that, in the case of a correspondingly dimensioned, in particular closed bearing, respectively in the case of closed bearing brackets 50, respectively 51 of a bearing gate of a cylinder head cover (not shown here), complete pushing of the finally mounted camshaft 1 through the closed bearing brackets 50, respectively 51 of the bearing gates of the cylinder head cover is made possible. Secondly, as in the case, for example, of the embodiments of the camshaft 1 in accordance with FIGS. 1 to 4, it would be possible that the camshaft 1, in particular the camshaft final assembly, is carried out within the cylinder head cover. It would be necessary here, however, that the anti-friction bearing 4, respectively 5 and the individual cams 2 and 3 are prepositioned in corresponding holding elements (not shown here). The shaft 9, with or without an end piece 6, could then be pushed through said positioned and advantageously heated elements, in particular the cams 2, 3 and the anti-friction bearings 4, 5, before the temperature equalization between the cams 2, 3, the anti-friction bearings 4, 5 and the shaft 9 takes place. It is also conceivable, however, that defined cutouts (not shown here) are provided in the cylinder head cover (not shown here), in particular in its bearing brackets, through which defined cutouts the tips of the cams 2, 3 are pushed during the introduction of the constructed camshaft 1 into the cylinder head cover.

Figure 6A:
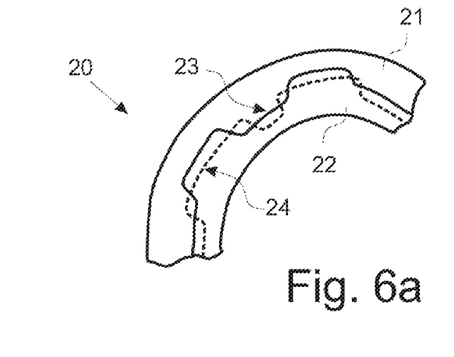
FIG. 6a is a detailed plan view of an end side of an example anti-friction bearing.

FIG. 6a shows a detail of a plan view of an end side of one embodiment of an anti-friction bearing 20 according to the invention which is configured, for example, as a needle bearing. The outer ring 21 and the inner ring 22 in each case have end-side projections 23, respectively 24 which extend in the radial direction. The projections 23 and 24 are configured so as to be spaced apart from one another axially. The projections 23 of the outer ring 21 and the projections 24 of the inner ring 22 also have a geometric design or dimension which differs from one another. It is also conceivable that the outer ring 21 and the inner ring 22 in each case have merely one projection 23, respectively 24 on the respective end side (the outer ring 21 and the inner ring 22 have in each case two end sides). Those projections 23 of the outer ring 21 which are configured on the respective end side and the projections 24 of the inner ring 22 of the rings 21, respectively 22 advantageously overlap at least in sections, with the result that friction occurs in said overlap region between the outer ring 21 and the inner ring 22. It is conceivable in accordance with FIG. 6a that the inner ring 22 has a smaller length (as viewed in the axial direction) than the outer ring 21, with the result that the inner ring 22 is accordingly enclosed axially, respectively delimited axially to the outside at least in sections by the outer ring 21 on account of the configuration of the projections 23 of the outer ring 21 or the projections 24 of the inner ring 22. As a result, the anti-friction bearing 20 forms a unit which is closed within itself, a movement in the axial direction of the outer ring 21 and/or the inner ring 22 being avoided, but a rotation in the circumferential direction of the inner ring 22 relative to the outer ring 21 still being possible, and the functionality of the bearing therefore not being impaired.

Figure 6B:
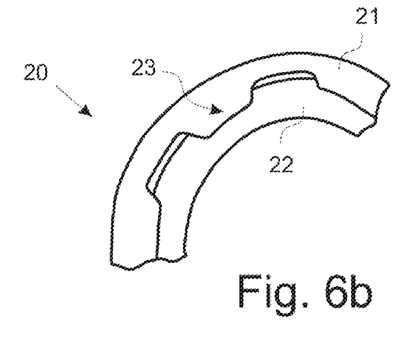
FIG. 6b is a detailed plan view of an end side of still another example anti-friction bearing.
Figure 6C:
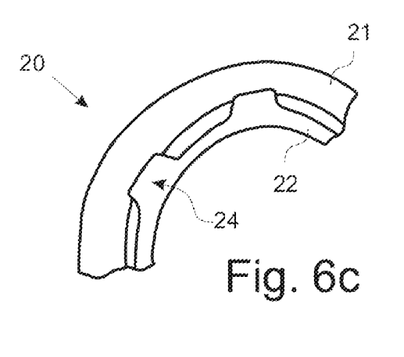
FIG. 6c is a detailed plan view of an end side of yet another anti-friction bearing.

FIGS. 6b and 6c in each case show a detail of a plan view of an end side of a further embodiment of an anti-friction bearing 20 according to the invention. Accordingly, in the embodiment in accordance with FIG. 6b, merely the outer ring 21 has projections 22, merely the inner ring 22 having projections 24 in accordance with the embodiment of FIG. 6c. The respective projections 23, respectively 24 advantageously always extend, as viewed in the axial direction, along the outer side of the end side of the other ring 21, respectively 22 which has no projections, as a result of which said projection-less ring 21, respectively 22 is delimited, respectively enclosed axially to the outside by the ring 21, respectively 22 with projections 23, respectively 24, as a consequence. The axially inner ring 21, respectively 22 is the inner ring 22 in FIG. 6b or the outer ring 21 in FIG. 6a. A reverse arrangement would also be conceivable, however, in the case of which the projections 23, respectively 34, respectively the at least one projection of one of the rings 21, respectively 22 extend, respectively extends, as viewed in the axial direction, on the inner side of that end side of the other projectionless ring 21, respectively 22 which also extends in the radial direction at least in sections.

LIST OF DESIGNATIONS 1 (Constructed) camshaft
2 Cam
2.1 Passage opening
3 Further cam
3.1 Passage opening
4 Anti-friction bearing
4.1 Outer ring
4.2 Inner ring
4.3 Rolling bodies
4.4 Cage
5 Further anti-friction bearing
6 End piece
7 Setting region
7.1 Elevation
8 Setting region
8.1 Elevation
9 Shaft
9.1 Through opening
9.2 Outer surface of the circumferential face
10 Longitudinal axis
20 Anti-friction bearing
21 Outer ring
22 Inner ring
23 End-side flanged edge
24 End-side flanged edge
30 Mounting direction
40 Bearing region
40.1 Elevation
50 Bearing bracket
51 Bearing bracket

What is claimed is:

1. A method for producing a constructed camshaft of an internal combustion engine, the camshaft comprising a cam, a shaft, and an anti-friction bearing, wherein the method comprises:
   machining the cam, wherein machining the cam comprises grinding such that the cam is ready for use;
   machining the shaft to produce a setting region for arranging the cam;
   heating the cam and the anti-friction bearing;
   pushing the cam onto the shaft into a preliminary position, and pushing the anti-friction bearing onto the shaft into a bearing position;
   equalizing a temperature between the shaft, the cam, and the anti-friction bearing by cooling at least the cam; and
   setting the cam onto an end position by way of pushing the cam onto the setting region.

2. The method of claim 1 comprising machining the shaft to produce a bearing region for the anti-friction bearing using a same machining technique that is used to produce the setting region.

3. A method for producing a constructed camshaft of an internal combustion engine, the camshaft comprising a cam, a shaft, and an anti-friction bearing, wherein the method comprises:
   machining the cam;
   machining the shaft to produce a setting region for arranging the cam;
   heating the cam and the anti-friction bearing;
   pushing the cam onto the shaft into a preliminary position, and pushing the anti-friction bearing onto the shaft into a bearing position;
   equalizing a temperature between the shaft, the cam, and the anti-friction bearing by cooling at least the cam; and
   setting the cam onto an end position by way of pushing the cam onto the setting region,
   wherein during the step of pushing the anti-friction bearing onto the shaft into a bearing position, the method comprises positioning on the shaft a spacer element on both sides of the anti-friction bearing.

4. The method of claim 3 comprising cooling the shaft before heating the cam and the anti-friction bearing.

5. The method of claim 3 comprising cooling the shaft after heating the cam and the anti-friction bearing.

6. The method of claim 3 wherein equalizing the temperature between the shaft, the cam, and the anti-friction bearing comprises heating the shaft.

7. The method of claim 3 wherein machining the shaft to produce the setting region comprises forming an elevation on an outer surface of a circumferential face of the shaft.

8. The method of claim 3 wherein machining the shaft comprises producing a bearing region for arranging the anti-friction bearing on the shaft.

9. The method of claim 8 wherein the bearing region is produced by forming an elevation on an outer surface of a circumferential face of the shaft.

10. The method of claim 9 wherein the elevation is formed by roll forming or grinding.

11. The method of claim 3 comprising directly heating the spacer elements with the cam and the anti-friction bearing prior to positioning the spacer elements on the shaft.

12. The method of claim 3 wherein prior to machining the shaft to produce the setting region, the method comprises connecting the shaft to an end piece.

13. The method of claim 3 wherein machining the cam comprises grinding such that the cam is ready for use.

14. The method of claim 3 wherein the anti-friction bearing is a cylindrical roller bearing.

15. The method of claim 3 wherein the anti-friction bearing is a needle bearing with an inner ring.

16. The method of claim 3 comprising machining the shaft to produce a bearing region for the anti-friction bearing using a same machining technique that is used to produce the setting region.

17. The method of claim 3 comprising machining the shaft to produce a bearing region for the anti-friction bearing using a machining technique that is different than a machining technique that is used to produce the setting region.

* * * * *